United States Patent
Montgomery-Recht et al.

(10) Patent No.: US 11,392,615 B2
(45) Date of Patent: Jul. 19, 2022

(54) PROCESS FOR ESTABLISHING TRUST BETWEEN MULTIPLE AUTONOMOUS SYSTEMS FOR THE PURPOSES OF COMMAND AND CONTROL

(71) Applicant: BOOZ ALLEN HAMILTON INC., McLean, VA (US)

(72) Inventors: Evan Montgomery-Recht, McLean, VA (US); James J. Ter Beest, McLean, VA (US)

(73) Assignee: BOOZ ALLEN HAMILTON, INC., McLean, VA (US)

( * ) Notice: Subject to any disclaimer, the term of this patent is extended or adjusted under 35 U.S.C. 154(b) by 41 days.

(21) Appl. No.: 16/843,257

(22) Filed: Apr. 8, 2020

(65) Prior Publication Data

US 2020/0242128 A1 Jul. 30, 2020

Related U.S. Application Data

(62) Division of application No. 16/044,129, filed on Jul. 24, 2018, now Pat. No. 10,650,023.

(51) Int. Cl.
*G06F 16/27* (2019.01)
*G06F 7/04* (2006.01)
(Continued)

(52) U.S. Cl.
CPC ............ *G06F 16/27* (2019.01); *H04L 9/0861* (2013.01); *H04L 9/3242* (2013.01); *H04L 63/06* (2013.01); *H04L 63/08* (2013.01); *H04L 2209/38* (2013.01)

(58) Field of Classification Search
CPC ...... G06F 16/27; H04L 9/0861; H04L 9/3242; H04L 63/06; H04L 63/08; H04L 2209/38
See application file for complete search history.

(56) References Cited

U.S. PATENT DOCUMENTS

| | | | |
|---|---|---|---|
| 6,367,009 B1 | 4/2002 | Davis et al. | |
| 7,003,555 B1 * | 2/2006 | Jungck | H04L 61/2503 709/219 |

(Continued)

OTHER PUBLICATIONS

International Search Report and Written Opinion of the International Searching Authority (Forms PCT/ISA/220, PCT/ISA/210 and PCT/ISA/237) dated Aug. 12, 2019, by the International Bureau of European Patent Office in International Application No. PCT/US19/34514. (14 pages).

*Primary Examiner* — Darshan I Dhruv

(74) *Attorney, Agent, or Firm* — Buchanan Ingersoll & Rooney PC

(57) ABSTRACT

A computer-automated method for securing unidirectional communication within a network. The method includes orchestrating an automated arrangement and/or coordination of at least one portion of a message using a top level orchestration server, transmitting a first data packet from the top level orchestration server to a first top level backbone server, wherein the first data packet is a first portion of the message, and authenticating the first data packet using the first top level backbone server. The method can include transmitting a second data packet from the first top level backbone server to a second top level backbone server, wherein the second data packet is a second portion of the message and/or the second data packet includes a modified first data packet, and authenticating the second data packet using the second top level backbone server.

15 Claims, 4 Drawing Sheets

(51) Int. Cl.
  *G06F 15/16*   (2006.01)
  *H04L 29/06*   (2006.01)
  *H04L 9/08*    (2006.01)
  *H04L 9/40*    (2022.01)
  *H04L 9/32*    (2006.01)

(56) References Cited

U.S. PATENT DOCUMENTS

| | | | |
|---|---|---|---|
| 8,161,164 B2 | 4/2012 | Chong | |
| 2002/0023104 A1* | 2/2002 | Satyavolu | G06F 21/41 |
| | | | 707/E17.119 |
| 2002/0023249 A1 | 2/2002 | Ternullo et al. | |
| 2002/0152384 A1* | 10/2002 | Shelest | H04L 9/3247 |
| | | | 713/176 |
| 2002/0199096 A1 | 12/2002 | Wenocur et al. | |
| 2003/0233423 A1* | 12/2003 | Dilley | H04L 67/2819 |
| | | | 709/217 |
| 2005/0050328 A1* | 3/2005 | Mizrah | H04L 9/0844 |
| | | | 713/171 |
| 2010/0030844 A1* | 2/2010 | Miyama | H04H 60/06 |
| | | | 709/231 |
| 2011/0055923 A1* | 3/2011 | Thomas | H04L 51/12 |
| | | | 709/217 |
| 2013/0054974 A1* | 2/2013 | Chung | H04L 9/3236 |
| | | | 713/181 |
| 2013/0198789 A1* | 8/2013 | Streeter | H04N 7/173 |
| | | | 725/94 |
| 2015/0032749 A1* | 1/2015 | Matsubara | G06F 16/35 |
| | | | 707/737 |
| 2015/0148008 A1 | 5/2015 | Fourtet et al. | |
| 2015/0244828 A1* | 8/2015 | Heydon | G06F 21/44 |
| | | | 709/232 |
| 2015/0350381 A1* | 12/2015 | Chang | H04L 47/28 |
| | | | 709/203 |
| 2016/0192192 A1 | 6/2016 | Seedorf et al. | |
| 2016/0337403 A1 | 11/2016 | Stoops et al. | |
| 2017/0026144 A1* | 1/2017 | Zinner | H04L 63/123 |
| 2017/0083248 A1* | 3/2017 | Kikuchi | G06F 3/0613 |
| 2017/0103489 A1* | 4/2017 | Asad | H04L 63/107 |
| 2017/0201985 A1* | 7/2017 | Wang | H04B 7/15528 |
| 2017/0230339 A1* | 8/2017 | Xie | G06F 21/64 |
| 2018/0091557 A1* | 3/2018 | Komu | H04L 63/08 |
| 2018/0284093 A1* | 10/2018 | Brown | H04L 9/0637 |
| 2018/0294955 A1* | 10/2018 | Rhie | G06F 16/27 |
| 2018/0299531 A1* | 10/2018 | Hiscock | G01S 5/0236 |
| 2018/0300382 A1* | 10/2018 | Madisetti | H04L 9/3263 |
| 2019/0043048 A1* | 2/2019 | Wright | H04L 9/3247 |
| 2019/0052454 A1* | 2/2019 | Wright | H04L 9/0861 |
| 2019/0081779 A1* | 3/2019 | Klarman | H04L 69/22 |
| 2019/0090132 A1* | 3/2019 | Li | H04L 63/0823 |
| 2019/0173739 A1* | 6/2019 | Cui | H04L 41/0668 |
| 2019/0238486 A1* | 8/2019 | Zizka | H04L 51/34 |
| 2019/0306129 A1* | 10/2019 | Waltermann | H04L 63/0478 |
| 2019/0319798 A1* | 10/2019 | Chalkias | H04L 9/088 |
| 2020/0274714 A1* | 8/2020 | Suson | H04L 9/3239 |
| 2020/0366479 A1* | 11/2020 | Lee | H04L 9/0861 |

\* cited by examiner

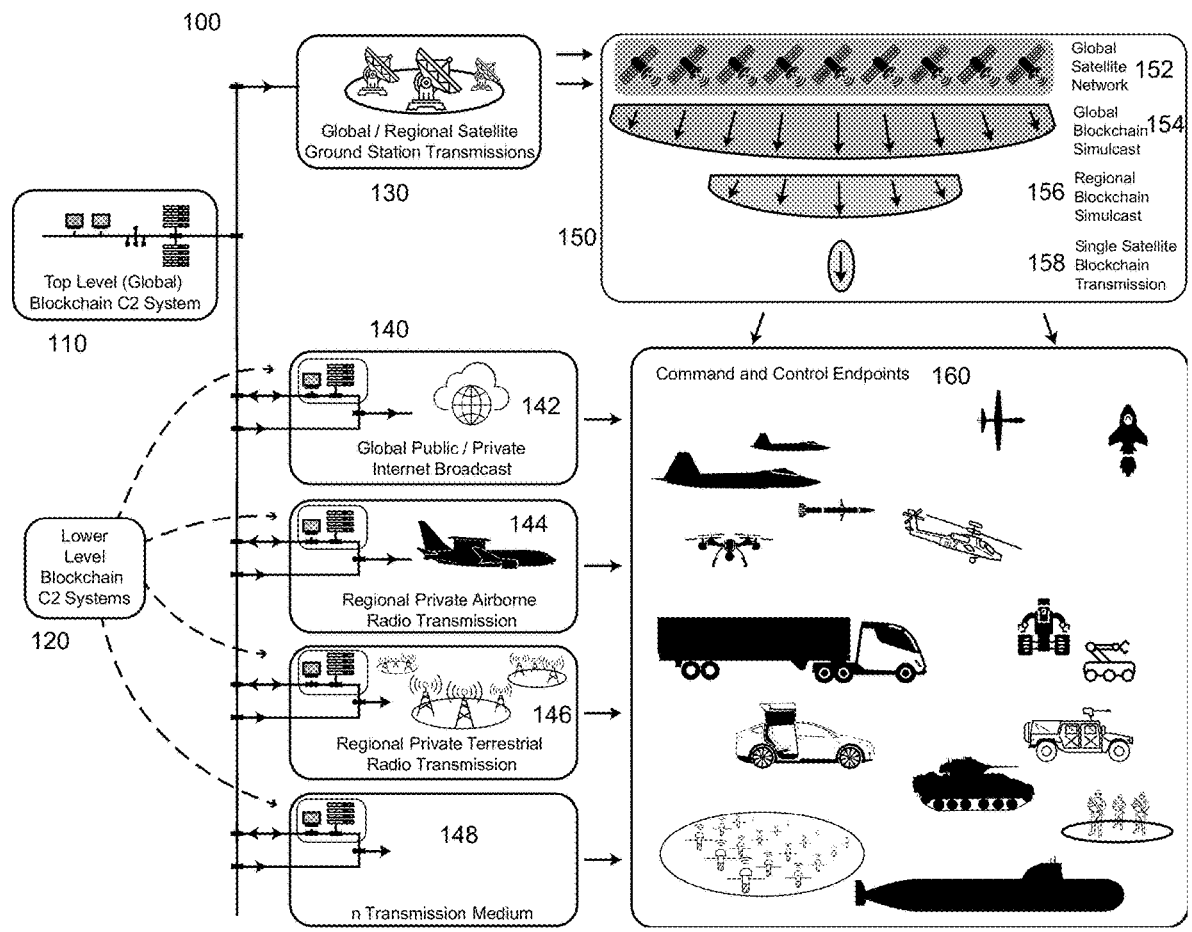
FIG. 1: Integrated, multi-tiered proof-of-authority command and control infrastructure.

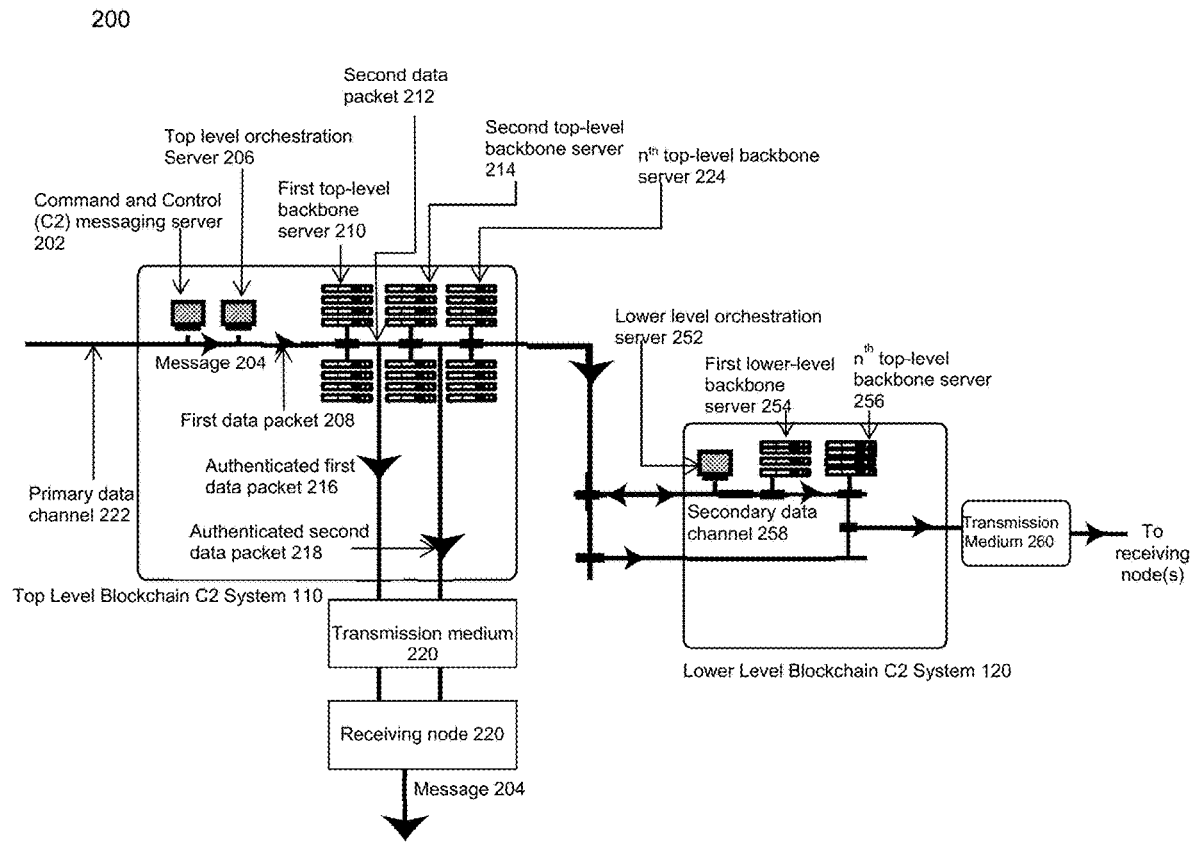
FIG. 2: Hierarchical command and control system.

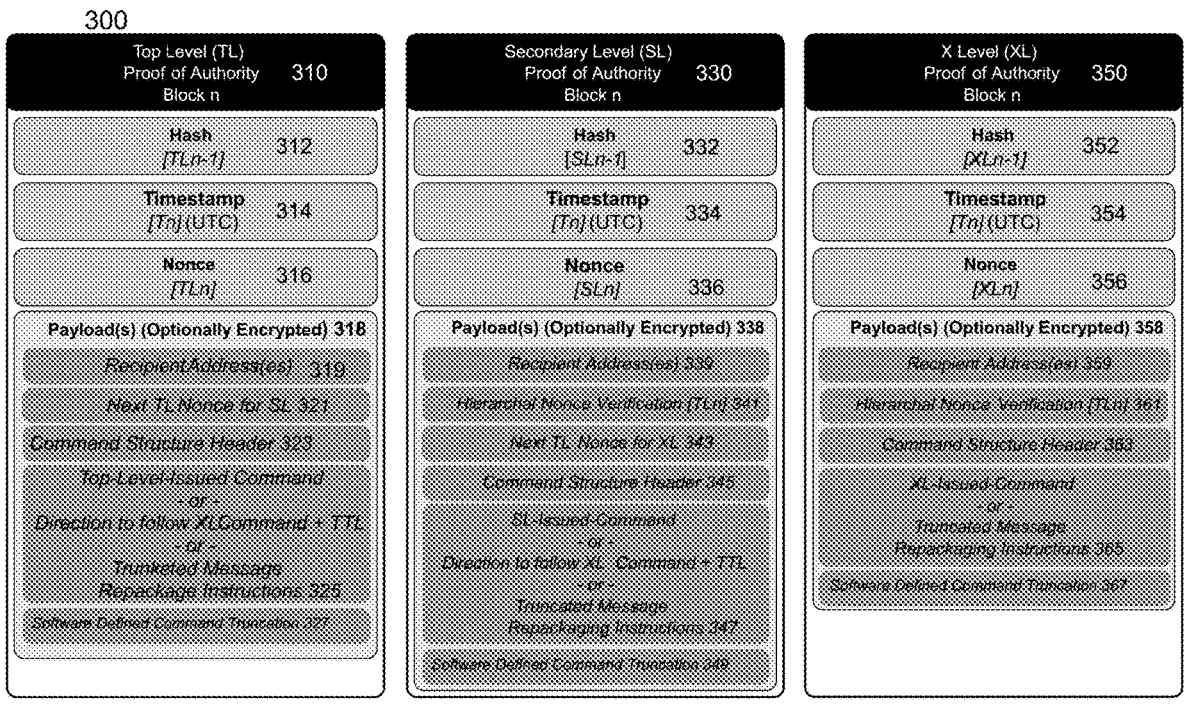
FIG. 3 Blocks for top level, secondary level, and X level proof-of-authority instantiations

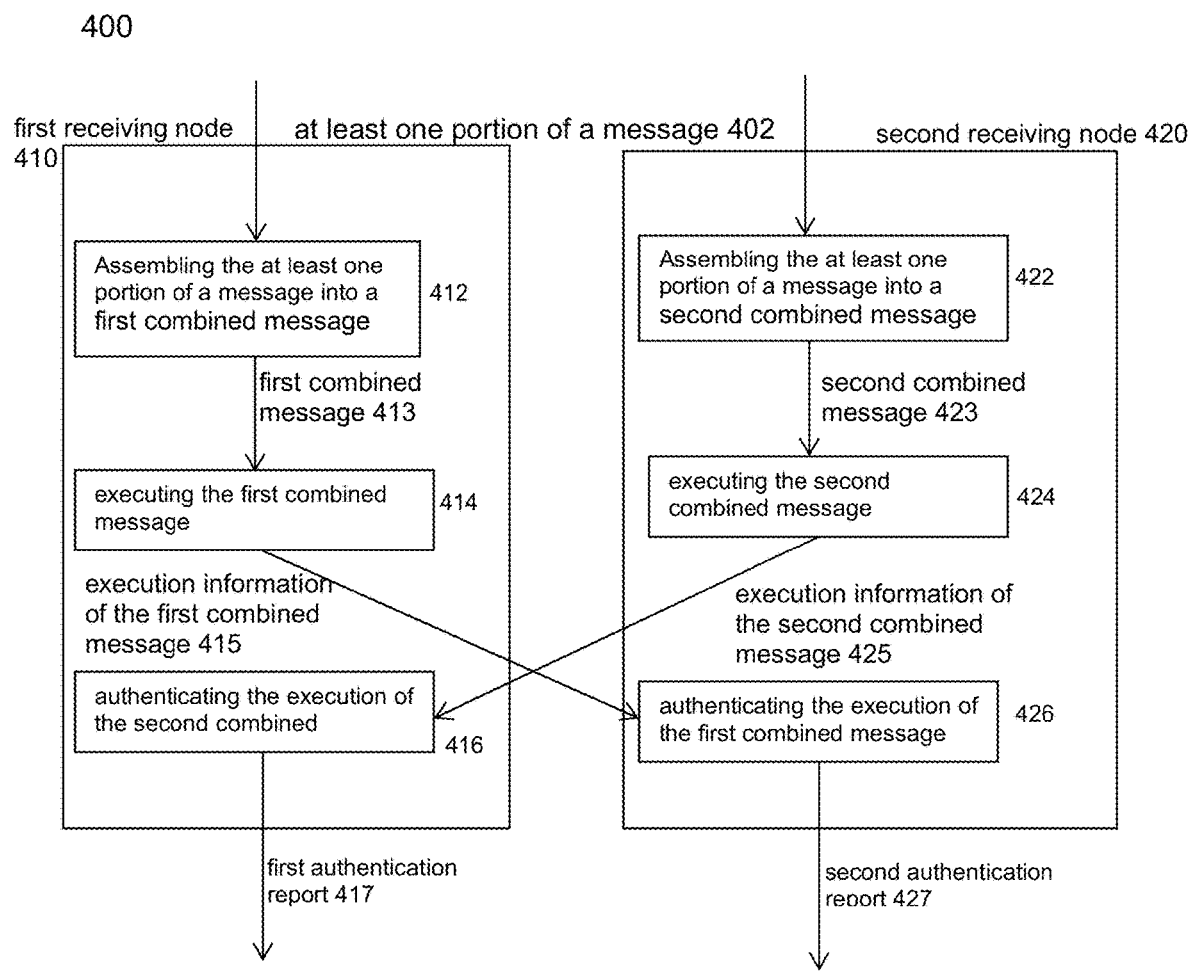
FIG. 4: Flowchart illustrating processing of a message at the receiving nodes.

PROCESS FOR ESTABLISHING TRUST BETWEEN MULTIPLE AUTONOMOUS SYSTEMS FOR THE PURPOSES OF COMMAND AND CONTROL

FIELD

An aspect of the present disclosure provides a method and a system for trusted, unidirectional communications for command and control systems.

BACKGROUND INFORMATION

It is desirable for organizations with command and control responsibilities to electronically communicate with devices in distributed geographic locations. This activity is critical in order to successfully exercise authority and direction by a properly designated operator over assigned resources in accomplishing a common goal. Issuing command and control instructions in this vein is often challenging due to devices residing in non-ideal conditions attempting to perform bi-directional network communications.

Bi-directional communications are often a prerequisite for command and control communications due to the multiple asynchronous exchanges of cryptographic keys and subsequent encrypted messaging in support of command issuance. This practice best achieves confidentiality, integrity, and availability (CIA) of the communications that satisfies organizational information assurance requirements. In order to achieve communications CIA, significant technical resources are often required and often at a great expense to the organization.

Proof-of-authority (PoA) is an algorithm used with blockchains that delivers comparatively fast transactions through a consensus mechanism based on identity as a stake. In PoA-based networks, transactions and blocks are validated by approved accounts, known as validators. Validators run software allowing them to put transactions in blocks. The process is automated and does not require validators to be constantly monitoring their computers.

With PoA individuals earn the right to become validators, so there is an incentive to retain the position that they have gained. By attaching a reputation to identity, validators are incentivized to uphold the transaction process, as they do not wish to have their identities attached to a negative reputation.

Three conditions for establishing a validator can be: 1) identity to be formally verified on-chain, with a possibility to cross-check the information in a publicly available domain; and/or 2) eligibility to be difficult to obtain, to make the right to validate the blocks earned and valued; and/or 3) uniformity in the checks and procedures for establishing an authority.

PoA can be considered more robust than Proof of Stake (PoS), because in PoS, while a stake between two parties may be even, it does not take into account each party's total holdings. The PoS mechanism works using an algorithm that selects participants with the highest stakes as validators, assuming that the highest stakeholders are incentivized to ensure a transaction is processed. This means that incentives can be unbalanced.

PoA can also be considered an alternative to Proof of Work (PoW) because PoW uses an enormous amount of computing power, which, in itself lowers incentive. The PoW consensus uses a mining mechanism that works by verifying that work (mining) has been done before transactions are carried out. PoW is also vulnerable to attack, as a potential attacker would only need to have 51% of the mining resources (hashrate) to control a network.

On the other hand, PoA only allows non-consecutive block approval from anyone validator, meaning that the risk of serious damage is minimized. PoA is suited for private networks and for public networks.

SUMMARY

A computer-automated method for securing unidirectional communication within a network is disclosed, the method comprising orchestrating an automated arrangement and/or coordination of at least one portion of a message using a top level orchestration server; transmitting a first data packet from the top level orchestration server to a first primary backbone server, wherein the first data packet is a first portion of the message; authenticating the first data packet using the first primary backbone server; transmitting a second data packet from the first primary backbone server to a second primary backbone server, wherein the second data packet is a second portion of the message and/or the second data packet includes a modified first data packet; and authenticating the second data packet using the second primary backbone server.

A computer-automated method for securing unidirectional communication within a network is disclosed, the method comprising receiving, in an orchestrated manner, at least one portion of a message at a first receiving node; assembling the received at least one portion into a first combined message at the first receiving node; executing the first combined message at the first receiving node; receiving, in an orchestrated manner, the at least one portion of the message at a second receiving node; assembling the received at least one portion into a second combined message at the second receiving node; executing the second combined message at the second receiving node; authenticating, at the second receiving node, the executing of the first combined message by the first receiving node; and authenticating, at the first receiving node, the executing of the second combined message by the second receiving node.

A system for securing unidirectional communication within a network is disclosed, the system comprising a top level orchestration server configured to orchestrate an automated arrangement and/or coordination of at least one portion of a message; a first primary backbone server configured to receive a first data packet from the top level orchestration server, and authenticate the first data packet, wherein the first data packet is a first portion of the message; and a second primary backbone server configured to receive a second data packet from the first primary backbone server, and authenticate the second data packet, wherein the second data packet is a second portion of the message, and/or the second data packet includes a modified first data packet.

BRIEF DESCRIPTION OF THE DRAWINGS

Other objects and advantages of the present disclosure will become apparent to those skilled in the art upon reading the following detailed description of exemplary embodiments, in conjunction with the accompanying drawings, in which like reference numerals have been used to designate like elements, and in which:

FIG. 1 illustrates exemplary conceptual component view of all systems working as an integrated, multi-tiered proof-of-authority command and control infrastructure;

FIG. 2 illustrates exemplary individual components of the command and control system;

FIG. 3 illustrates exemplary subcomponent messaging within each block for Top Level, Secondary Level, and X Level proof-of-authority instantiations; and FIG. 4 illustrates a flowchart illustrating processing of a message at receiving nodes.

DETAILED DESCRIPTION

An aspect of the present disclosure relates to a technique to establish trust communications from command and control authority systems to autonomous devices receiving instructions in uncontrolled and often austere environments. Cyber attackers can use command and control infrastructure to issue command and control instructions to their victims. Analysis of command and control methodologies can be used to identify attackers, associate attacks, disrupt ongoing malicious activity, and provide an indication of network security.

Network security can relate to the policies and practices adopted to prevent and monitor unauthorized access, misuse, modification, or denial of a computer network and network-accessible resources. Network security can involve the authorization of access to data in a network, which may be controlled by the network administrator. Network security can cover a variety of computer networks, both public and private, that are used in everyday jobs; conducting transactions and communications among businesses, government agencies and individuals. Networks can be private, such as within a company, and others which might be open to public access. Network security can be involved in organizations, enterprises, and other types of institutions. An indication of network security may provide information related to whether the network is secure or has been breached.

An aspect of the present disclosure can leverage a proof-of-authority blockchain system that can be used to generate an ongoing data channel. This data channel can be a sequential series of cryptographic messages that can be distributed over one or more transmission systems 130, such as a globally available satellite network 150, and can also be transmitted across terrestrial wireless 146 or wired networks.

A globally available satellite network 150 can include satellites that can relay and/or amplify radio telecommunications signals via a transponder, thereby creating a communication channel between a source transmitter and a receiver at different locations on Earth. The network of satellites can be used for television, telephone, radio, internet, military applications, or other applications. Global satellite networks, such as Iridium, Globalstar and Orbcomm, can include dozens of similar satellites which are put in orbit at regularly spaced positions and form a mesh network, sometimes sending and receiving information directly among them.

Terrestrial wireless networks can use Earth-based transmitters and receivers for communications. Wired networks can transfer data over a wire-based communication technology. In a small wired network, a single router may be used to connect all the computers. Larger networks can involve multiple routers or switches that connect to each other. Waveguide (electromagnetism), used for high-power applications, can also be considered as wired line. Local telephone networks can form the basis for wired communications that are used by both residential and business customers in the area. Wired networks can use fiber-optic communication technology as a means of providing clear signaling for both inbound and outbound transmissions.

All these networks can operate both via synchronous or asynchronous methods. Synchronous methods can include a data transfer method characterized by a continuous stream of data in the form of signals which can be accompanied by regular timing signals generated by a clocking mechanism that can ensure that both the sender and receiver are synchronized with each other. Asynchronous communication can include exchange of messages by reading and responding as schedules permit rather than according to a clock that is synchronized for both the sender and receiver.

A primary data channel 160 of the ongoing data channel can be a top-level hierarchal cryptographic stream that can be sent over a globally-available system 130. The top-level system 110 can also provide a means for lower level systems 120 to create a forked system that can instantiate secondary and/or tertiary command and control networks with segregated purposes, e.g., geographical, organizational, spectral, temporal, operational, or other technical purposes.

An impact and usefulness of the present disclosure can be to leverage highly controlled, globally available, communications systems that can operate as a top-level publisher. The instantiation of distributions systems 130 (such as global satellite systems) can establish a means to provide real-time, global visibility, redundant, reliable, and parallel views (using multiple spectrums and transmissions mediums, etc.) that can mitigate question of authenticity and/or malicious intent. Messaging can be intended for direct recipients and simultaneously as a hierarchal data channel for secondary/tertiary command and control (C2) distribution systems which can inherit and retransmit immutable trust from the hierarchal system. All messaging (from primary and tertiary systems) can potentially be seen by the end recipient to measure authenticity. Verifiable temporal actions taken by other participants in the network can help ensure the authenticity of the message by providing a method for other participants to ensure messages received can be validated through independent activities or actions taken by other participants.

An aspect of the present disclosure relates to a computer-automated method for securing unidirectional communication within a network. Such a communication within a network can allow data to travel only in one direction, and can help in information security. This communication may occur automatically, that is, with little or no direct human control.

The method can include orchestrating an automated arrangement and/or coordination of at least one portion of a message 204 using a top level orchestration server 206. Orchestration can include having an inherent intelligence and/or implicitly autonomic control that can be an effect of automation or systems deploying elements of control theory. Orchestration can define policies and service levels through automated workflows, provisioning, and change management, thereby creating an application-aligned infrastructure that can be scaled up or down based on the needs of each application. Orchestration can provide centralized management of the resource pool, including billing, metering, and chargeback for consumption. For example, orchestration can reduce the time and effort for deploying multiple instances of a single application, and as more resources or a new application are required, automated tools can perform tasks that previously could only be done by multiple administrators operating on their individual pieces of the physical stack.

The method can include transmitting a first data packet 208 from the top level orchestration server 206 to a first top level backbone server 210, wherein the first data packet 208 is a first portion of the message 204. The first top level backbone server 210 can be a computer program or a device that can provide functionality for other programs or devices. The method can include authenticating the first data packet using the first top level backbone server 210. The authenticating of the first data packet can include confirming an identity of the first data packet 208 at the first top level backbone server 210.

The method can include transmitting a second data packet 212 from the first top level backbone server 210 to a second top level backbone server 214, wherein the second data packet 212 is a second portion of the message 204 and/or the second data packet 212 includes a modified first data packet. The second top level backbone server 214 can be a computer program or a device that can provide functionality for other programs or devices. The first data packet 208 and the second data packet 212 can be parts of a precisely timed sequential series of cryptographic messages distributed over a transmission system and/or a network. The second data packet 212 can be a second portion of the message 204, which is distinct from the first portion of the message 204. The second data packet 212 can include the first data packet 208 along with additional information.

The method can include authenticating the second data packet 212 using the second top level backbone server 214. The authenticating of the second data packet 212 can include confirming an identity of the second data packet 212 at the second top level backbone server 214.

The method can include, after the authentication of the first data packet 208 by the first top level backbone server 210, transmitting the authenticated first data packet 216 from the first top level backbone server 210 to a receiving node 220. The receiving node 220 can be a device or data point on a network. The receiving node 220 can have an Internet Protocol (IP) address. The receiving node 220 can be a part of a larger data structure, such as linked lists or tree data structures.

The method can include, after the authentication of the second data packet 212 by the second top level backbone server 214, transmitting the authenticated second data packet 218 from the second top level backbone server 214 to the receiving node 220, wherein the second data packet 212 is the second portion of the message 204. The second data packet 212 can be distinct from the first data packet 208.

The method can include transmitting the authenticated second data packet 218 from the second top level backbone server 214 to the receiving node 220 before the transmission of the authenticated first data packet 216 from the first top level backbone server 210 to the receiving node 220. The transmission of the authenticated second data packet 218 to the receiving node 220 can occur before the transmission of the authenticated first data packet 216 to the receiving node 220. The transmission of the authenticated second data packet 218 to the receiving node 220 can also occur after the transmission of the authenticated first data packet 216 to the receiving node 220.

The method can include, in combination with a receiving node 220, assembling, at the receiving node 220, the authenticated first data packet 216 and the authenticated second data packet 218 to form the message 204. The authenticated first data packet 216, the authenticated second data packet 218, and/or other portions of the message 204 can be combined to form the whole message 204 at the receiving node 220.

The method can include receiving at least one portion of the message 204 at a lower level orchestration server 252, and orchestrating an automated arrangement and/or coordination of the at least one portion of the message 204 using the lower level orchestration server 252.

The method can include transmitting one or more portions of the at least one portion of the message from the lower level orchestration server 252 to a first lower level backbone server 254. The method can include authenticating, using the first lower level backbone server 254, the one or more portions of the message transmitted to the first lower level backbone server 254. The first lower level backbone server 254, the first top level backbone server 210, and the second top level backbone server 214 can be a part of a hierarchical control system 200 such that the first top level backbone server 210 and the second top level backbone server 214 are arranged at a top level of the hierarchical control system 200, and the first lower level backbone server 254 is arranged at least one level lower than the top level of the hierarchical control system 200.

The hierarchical control system 200 can include many controlled servers to transmit sequential messages. These controlled servers can be arranged at many different levels of the hierarchical control system 200. For example, FIG. 2 shows $n^{th}$ top-level backbone server 224 arranged at the top level, and $n^{th}$ lower-level backbone server 256 arranged at a lower level.

The hierarchical control system 200 can be a form of a control system in which a set of devices and governing software can be arranged in a hierarchical tree. When the links in the hierarchical tree are implemented by a computer network, then that hierarchical control system can also be a form of networked control system. Each element of the hierarchy can be a linked node in the tree. Commands, tasks and goals to be achieved can flow down the tree from superior nodes to subordinate nodes, whereas sensations and command results can flow up the tree from subordinate to superior nodes. Nodes may also exchange messages with their siblings. Each higher layer of the tree can operate with a longer interval of planning and execution time than its immediately lower layer. The lower layers can have local tasks, goals, and sensations, and their activities can be planned and coordinated by higher layers which may not override their decisions. The layers can form a hybrid intelligent system in which the lowest, reactive layers can be sub-symbolic. The higher layers, having relaxed time constraints, are capable of reasoning from an abstract world model and can perform planning.

The method can include receiving the message 204 at the top level orchestration server 206 from a command and control (C2) messaging server 202. The command and control messaging server 202 can create a new message and transmits at least one portion of the message to the top level orchestration server 206 that is further transmitted to one or more servers in the hierarchical control system 200, thereby maintaining an ongoing messaging primer. The servers in the hierarchical control system 200 can determine the authenticity of the most recent message, and plan for the next timed message. This form of sequential messaging is known as proof-of-authority.

The method can include generating the message using the top level orchestration server 206. The top level orchestration server 206 can also create a new message and transmit at least one portion of the message to one or more servers in the hierarchical control system 200.

The method can include generating, by the first top level backbone server 210, one or more reports based on the authentication of the first data packet 208. The method can include generating, by the second top level backbone server 214, one or more reports based on the authentication of the second data packet 212.

The one or more reports can include event reports from different monitors that can correlate activity to identify attacks causing disturbances and/or suspicious activities in one or more network entities. Streams of event records can be derived from discarded traffic (i.e., packets not allowed through the gateway because they violate filtering rules), pass-through traffic (i.e., packets allowed into the internal network from external sources), packets having a common protocol (e.g., all ICMP (Internet Control Message Protocol) packets that reach the gateway), packets involving network connection management (e.g., SYN, RESET, ACK, [window resize]), and packets targeting ports to which an administrator has not assigned any network service and that also remain unblocked by the firewall. Event streams may also be based on packet source addresses (e.g., packets whose source addresses match well-known external sites such as satellite offices or have raised suspicion from other monitoring efforts) or destination addresses (e.g., packets whose destination addresses match a given internal host or workstation). Selection can also implement application-layer monitoring (e.g., packets targeting a particular network service or application). Event records can also be produced from other sources of network packet information such as report logs produced by network entities.

The method can include deploying a plurality of servers on the network, wherein the plurality of servers include at least one of the top level orchestration server 206, the first top level backbone server 210, and the second top level backbone server 214. Deploying a server can include, but is not limited to, installing operating system, installing applications, configuring network settings (such as IP address, and default gateway), patching the server into the LAN switch, configuring appropriate firewall rules to allow required access to the server, and adding the server into monitoring and management platforms. The plurality of servers may be deployed with multiple silos.

The method can include, after the authentication of the second data packet 212 by the second top level backbone server 214, transmitting the authenticated second data packet 218 from the second top level backbone server to a receiving node, wherein the second data packet 212 includes the first data packet 208 and a top level key 310, the top level key 310 includes at least one of a cryptographic nonce 312, hashing information 314, time stamp information 316, and payload information 318. The payload information 318 may be encrypted. The payload information 318 can include at least one of Recipient Address(es) 319, next top level nonce for a lower level 321, command structure header for top level 323, top level issued command or direction to follow a lower level command or truncated message repackaging instructions 325, and software defined command truncation 327.

A data packet and/or a message as described in this application can be a unique file including standard components of a block: the cryptographic hash of the previous block, the timestamp, a nonce (one-time pseudo-random number), payload information, temporal data, and mathematical algorithms. This can be identical to common forms of blockchain such as Bitcoin and Ethereum. A data packet as described in this application can be a unit of data made into a single package that travels along a given network path. The top level key 310 can be a parameter that can determine a functional output of a cryptographic algorithm. For encryption algorithms, the top level key 310 can specify a transformation of plaintext into cipher-text, and a transformation of cipher-text into plaintext for decryption algorithms. The cryptographic nonce 316 can be an arbitrary number that can be used just once. The cryptographic nonce 316 can be a random or pseudo-random number that can be issued in an authentication protocol to ensure that old communications cannot be reused in replay attacks.

The hashing information 312 can include a function that can be used to map data of any size to a fixed size. A data structure called a hash table can be used in for rapid data lookup. Hash functions can accelerate table or database lookup by detecting duplicated records in a large file. A cryptographic hash function can easily verify that input data maps to a given hash value, but if the input data is unknown; it is deliberately difficult to reconstruct it (or any equivalent alternatives) by knowing the stored hash value. This feature can be used for assuring integrity of transmitted data, and is the building block for HMACs, which provide message authentication.

The time stamp information 314 can include a sequence of characters or encoded information identifying when a certain event occurred by providing a date and time information. The payload information 318 can be a data to be transmitted that can be encapsulated in a frame composed of framing bits and a frame check sequence. The payload information 318 can be owner/user defined.

An aspect of the present disclosure relates to a computer-automated method for securing unidirectional communication within a network. This method can include receiving, in an orchestrated manner, at least one portion of a message 402 at a first receiving node 410, assembling 412 the received at least one portion of the message 402 into a first combined message 413 at the first receiving node 410, and executing 414 the first combined message 413 at the first receiving node 410.

The method can include receiving, in an orchestrated manner, the at least one portion of the message 402 at a second receiving node 420, assembling 422 the received at least one portion of the message 402 into a second combined message 423 at the second receiving node 420, and executing 424 the second combined message 423 at the second receiving node 420. The executing of the combined messages can include a process by which a computer or a virtual machine performs the instructions of a computer program. The instructions in the program can trigger sequences of simple actions on the executing machine. Those actions can produce effects according to the semantics of the instructions in the program.

The first and second receiving nodes can be devices or data points on a network. The nodes can have an Internet Protocol (IP) address. The nodes can be a part of a larger data structure, such as linked lists or tree data structures. The received portions of the message can be combined to form the whole message at the receiving nodes.

The method can include authenticating at the second receiving node 426, the executing of the first combined message by the first receiving node 415, and authenticating at the first receiving node 416, the executing of the second combined message by the second receiving node 425. The authenticating of the messages can include confirming an identity of messages at the receiving nodes. The method can include generating by the first receiving node 410, a first authentication report 417 based on the authentication of the executing of the second combined message by the second receiving node. The method can include generating by the second receiving node 420, a second authentication report 427 based on the authentication of the executing of the first combined message by the first receiving node.

The methods in the present disclosure can be implemented by a device with a processor with an associated memory. The processor may include any integrated circuit or other electronic device (or collection of devices) capable of performing an operation on at least one instruction including, without limitation, Reduced Instruction Set Core (RISC) processors, CISC microprocessors, Microcontroller Units (MCUs), CISC-based Central Processing Units (CPUs), and Digital Signal Processors (DSPs). The hardware of such devices may be integrated onto a single substrate (e.g., silicon "die"), or distributed among two or more substrates. Furthermore, various functional aspects of the processor may be implemented solely as software or firmware associated with the processor. The associated memory can be volatile (such as RAM), non-volatile (such as ROM, flash memory, etc.) or some combination of the two. The computer memory includes, but is not limited to, RAM, ROM, EEPROM, flash memory or other memory technology CDROM, digital versatile disks (DVD) or other optical storage, magnetic cassettes, magnetic tape, magnetic disk storage or other magnetic storage devices, or any other medium which can be used to store the desired information and which can accessed by the device.

The associated memory can be a local memory that is specific to a single function or program. The memory can be a remote memory that does not reside in a device, or resides in a different device. Depending on the exact configuration and type of computing device, the memory can be volatile (such as RAM), non-volatile (such as ROM, flash memory, etc.) or some combination of the two. The computer memory includes, but is not limited to, RAM, ROM, EEPROM, flash memory or other memory technology CDROM, digital versatile disks (DVD) or other optical storage, magnetic cassettes, magnetic tape, magnetic disk storage or other magnetic storage devices, or any other medium which can be used to store the desired information and which can accessed by the device.

The method can include that the associated memory be configured on different types of memory. In an embodiment, the associated memory can be configured on a computer-readable medium. The term "computer-readable medium" (or "machine-readable medium") as used herein is an extensible term that refers to any medium or any memory, that participates in providing instructions to a processor, (such as processor) for execution, or any mechanism for storing or transmitting information in a form readable by a machine (e.g., a computer). Such a medium may store computer-executable instructions to be executed by a processing element and/or control logic, and data which is manipulated by a processing element and/or control logic, and may take many forms, including but not limited to, non-volatile medium, volatile medium, and transmission medium. Transmission media includes coaxial cables, copper wire and fiber optics, including the wires that include bus. Transmission media can also take the form of acoustic or light waves, such as those generated during radio-wave and infrared data communications, or other form of propagated signals (e.g., carrier waves, infrared signals, digital signals, etc.). Forms of computer-readable media include, for example, a floppy disk, a flexible disk, hard disk, magnetic tape, or any other magnetic medium, a CD-ROM, any other optical medium, punch-cards, paper-tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer-readable media may be involved in carrying one or more sequences of one or more instructions to a processor for execution. For example, the instructions may initially be carried on a magnetic disk of a remote computer. The remote computer can load the instructions into its dynamic memory and send the instructions over a telephone line using a modem. A modem local to computer system can receive the data on the telephone line and use an infra-red transmitter to convert the data to an infra-red signal. An infra-red detector can receive the data carried in the infra-red signal and appropriate circuitry can place the data on bus. Bus carries the data to main memory, from which processor retrieves and executes the instructions. The instructions received by main memory may optionally be stored on storage device either before or after execution by a processor.

An aspect of the present disclosure relates to a system for securing unidirectional communication within a network. The system can provide a globally available command and control communication that may not require a direct exchange of information to maintain integrity of the network.

The system can include a top level orchestration server 206 configured to orchestrate an automated arrangement and/or coordination of at least one portion of a message 204. The system can include a first top level backbone server 210 configured to receive a first data packet 208 from the top level orchestration server 206, and authenticate the first data packet 208, wherein the first data packet 208 is a first portion of the message 204.

The system can include a second top level backbone server 214 configured to receive a second data packet 212 from the first top level backbone server 210, and authenticate the second data packet 212, wherein the second data packet 212 is a second portion of the message 204, and/or the second data packet 212 includes a modified first data packet.

The system can include a receiving node 220 configured to receive an authenticated first data packet 216 from the first top level backbone server 210, after the authentication of the first data packet by the first top level backbone server 210; and receive an authenticated second data packet 218 from the second top level backbone server 214, after the authentication of the second data packet by the second top level backbone server 214, wherein the second data packet 212 is the second portion of the message 204.

The system can include a receiving node configured to receive an authenticated second data packet 218 from the second top level backbone server 214 after the authentication of the second data packet by the second top level backbone server 214, wherein the second data packet 212 includes the first data packet 208 and a top level key 310, the top level key 310 includes at least one of a cryptographic nonce 312, hashing information 314, time stamp information 316, and payload information 318. The payload information 318 may be encrypted. The payload information 318 can include at least one of Recipient Address(es) 319, next top level nonce for a lower level 321, command structure header for top level 323, top level issued command or direction to follow a lower level command or truncated message repackaging instructions 325, and software defined command truncation 327.

The system can include a lower level orchestration server 252 configured to receive at least one portion of the message 204, and orchestrate an automated arrangement and/or coordination of the at least one portion of the message 204. The system can include a first lower level backbone server 254 configured to receive one or more portions of the at least one portion of the message from the lower level orchestration server 252 and authenticate the one or more portions.

The system can include a hierarchical control system 200 with at least two levels, wherein each level includes at least one server, and wherein the first top level backbone server 210 and the second top level backbone server 214 are arranged at a top level of the hierarchical control system 200, and the first lower level backbone server 254 is arranged at least one level lower than the top level. The hierarchical control system 200 can include many controlled servers to transmit sequential messages. These controlled servers can be arranged at many different levels of the hierarchical control system 200. For example, FIG. 2 shows $n^{th}$ top-level backbone server 224 arranged at the top level, and $n^{th}$ lower-level backbone server 256 arranged at a lower level.

The system can leverage communications networks to broadcast messages from many agnostic lenses. For example, in a geospatial environment, the system can be globally available, regional, or local, such that the radio frequency coverage need only be sized to the coverage of intended recipients. In addition, the network can transmit (and be received) in virtually any environment. This can include outside earth's atmosphere, airborne, ground, sea, or sub surface platforms.

A temporal aspect of the system provides that the frequency of messages can be established at any interval based on the needs of the organization, technical capabilities of computer arrays that generate new messages, a bandwidth able to communicate the volume of messages, and a capability of a user device to listen to, decrypt, and process the network's traffic.

A spectral aspect of the system provides that the frequency of transmission for the system may vary across electromagnetic, optical, or other radiating emissions. This capability can provide significant means to parallelize cryptographic messages to particular organizations, especially when faced with bandwidth constraints, coverage to remote users, or organizations with security challenges.

Similar to the spectral aspect, a protocol/channel aspect of the system provides that messages may flow across a network link using different approaches. For instance, a message could be embedded in metadata of an existing streaming multimedia-payload. A message could be routinely sent across different orthogonal channels on the same link. An identical message may also be sent multiple times on different channels (using specific ear-markers to differentiate) to increase likelihood of receipt for custom critical systems.

An organizational aspect of the system may be put to use as a nationalized infrastructure but could be used independently as commercial or private system if a subordinate system were put into place for such use. An aspect of the system can be used across multiple domains, where organizations or stakeholders must communicate. Actions taken through other means would generally utilize trust-but-verify methods to ensure multiple domains have a method to validate that actions being requested or taken have a formal verifiable method.

Messages in the system can be received by any properly equipped radio receiver that is able to demodulate the RF information, view the payload information, and support actions as prescribed by the messaging (if able to be correctly interpreted—the payload information may be further encrypted by the original sender using external methods). The recipients may be designed to acknowledge receipt of communications via another communications medium, or simply carry out instructions. Examples of this may include an array of low power, long lasting field sensors that broadcast data when an organization sends out a local receiver in the vicinity of the sensors. Regional messaging may include satellite-based natural disaster alerting systems. Local alerts may even target single devices listening for a single instruction to act upon.

The receiver can be designed to listen to specific systems licensed with controlled frequencies which could be incredibly dynamic due to software defined radio technologies. Based on the dynamic messaging, the receiver can authenticate the messaging over a time window to begin trusting the systems it is listening to. The system is expected to mitigate malicious behavior due to the real-time nature of messaging, the immutability of the originating signal, and the parallelization of subsequent messages which leverage original primer messaging.

The system and the associated method have many advantages. For example, the system can transmit secure information; maintain trustworthy communication, all while only sending information in one direction, with no expectation by the command module of having a direct verification method from intended recipient. Therefore, the system can provide a secure unidirectional communication. The system can operate without an exchange of information to reveal the location of a command and control receiver location. It is optional, however to equip the receiver with an out-of-band method to acknowledge receipt if confirmation is required.

The system is easily scalable. Additional servers can be added to increase the frequency of transmissions and integrity of operations. Additionally, any number of secondary or tertiary command and control server groups can be added to scale the granularity of command groups across different transmission systems, organizations, or geographies.

The system may use existing infrastructure. No new communications architectures are necessary, only available bandwidth to transmit the information and new servers to instantiate a proof of authority infrastructure. The nature of the software defined means of randomly obfuscating messaging across space, time, spectrum, and protocols (all while encrypting the payloads) provides a means to defend against man-in-the middle attacks and advanced brute force attempts to intercept and decrypt the information in a time necessary to make an impact on the commands issued. The system can provide resilient messaging, where identical command and control messages can be sent in parallel across multiple disparate transmission sources to prevent transmission vulnerabilities across one specific medium (e.g. RF jamming).

An aspect of the present disclosure can be used in, but is not limited to, military and defense applications, governmental and non-governmental applications such as communicating disaster relief efforts, autonomous transportation, financial services such as release of financial assets to support activities in remote locations, public utilities such as meter reading, autonomous remote operators such as robots performing a clean-up on a nuclear disaster site, industrial control systems, remote sensing, and agriculture.

An aspect of the present disclosure can be used in secure mobile device communications. For example, an application running in the Trusted Execution Environment (TEE) of a mobile phone that could interpret the commands from a low level blockchain command and control system received through the mobile phone's radios and repeat them back through the radios, can direct the activities of phones in a certain area. A specific example of this application can be sending a command to a phone over GSM, and the phone would repeat the command over an 802.11 ad-hoc network or Bluetooth. Recipient phones could repeat the command with their own signature applied, alerting the community of phones as to the number of phones in an area. When a critical mass of phones is claimed in the command message, a payload could be executed. For example, for changing transmission frequency or key updates, or creating a Pokemon Go target or issuing a Groupon.

It will be appreciated by those skilled in the art that the present disclosure can be embodied in other specific forms without departing from the spirit or essential characteristics thereof. The presently disclosed embodiments are therefore considered in all respects to be illustrative and not restricted. The scope of the disclosure is indicated by the appended claims rather than the foregoing description and all changes that come within the meaning and range and equivalence thereof are intended to be embraced therein.

What is claimed is:

1. A computer-automated method for securing unidirectional communication within a network, the method comprising:
   receiving, in an orchestrated manner, at least one portion of a message at a first receiving node of a blockchain network;
   assembling the received at least one portion of the message into a first combined message at the first receiving node, the first combined message including executable instructions for producing a first machine effect;
   executing the executable instructions of the first combined message at the first receiving node to produce the first machine effect on the blockchain network;
   receiving, in an orchestrated manner, the at least one portion of the message at a second receiving node of the blockchain network;
   assembling the received at least one portion of the message into a second combined message at the second receiving node, the second combined message including executable instructions for producing a second machine effect;
   executing the executable instructions of the second combined message at the second receiving node to produce the second machine effect on the blockchain network;
   authenticating, at the second receiving node, the executing of the first combined message by the first receiving node based on an identity of the first combined message on the blockchain network; and
   authenticating, at the first receiving node, the executing of the second combined message by the second receiving node based on an identity of the second combined message on the blockchain network.

2. The method of claim 1, comprising:
   generating, by the first receiving node, a first authentication report based on the authentication of the executing of the second combined message by the second receiving node.

3. The method of claim 1, comprising:
   generating, by the second receiving node, a second authentication report based on the authentication of the executing of the first combined message by the first receiving node.

4. The method of claim 1, wherein the steps of authenticating the executing of the first combined message and the second combined message comprises:
   confirming an identity of messages at the receiving nodes.

5. The method of claim 1, wherein receiving at least one portion of a message at the first receiving node comprises:
   receiving a first portion of the message from a first top level backbone server.

6. The method of claim 5, comprising:
   receiving a second portion of the message from a second top level backbone server.

7. The method of claim 6, wherein the second portion of the message includes the first portion of the message and a top level key.

8. The method of claim 7, wherein the top level key is parameter that determines a functional output of a cryptographic algorithm.

9. The method of claim 8, wherein the top level key includes at least one of a cryptographic nonce, hashing information, time stamp information, and payload information.

10. The method of claim 9, wherein the payload information is encrypted.

11. The method of claim 9, wherein the payload information includes at least one of: one or more receipt addresses, a next top level nonce for a lower level, a command structure header for a top level, a top level issued command or direction to follow a lower level command or truncated message repackaging instruction, and a software defined command truncation.

12. The method of claim 9, wherein the cryptographic nonce is a value that is used once.

13. The method of claim 9, wherein the cryptographic nonce is a random or pseudo-random number that can be issued in an authentication protocol to ensure that old communications cannot be reused in replay attacks.

14. The method of claim 1, wherein receiving the at least one portion of the message at the second receiving node comprises:
   receiving a first portion of the message from a first top level backbone server.

15. The method of claim 14, comprising:
   receiving a second portion of the message from a second top level backbone server.

* * * * *